No. 762,667. PATENTED JUNE 14, 1904.
C. H. WEAVER & L. H. HOUGHTON.
FLEXIBLE PIPE JOINT.
APPLICATION FILED JUNE 6, 1903.
NO MODEL.
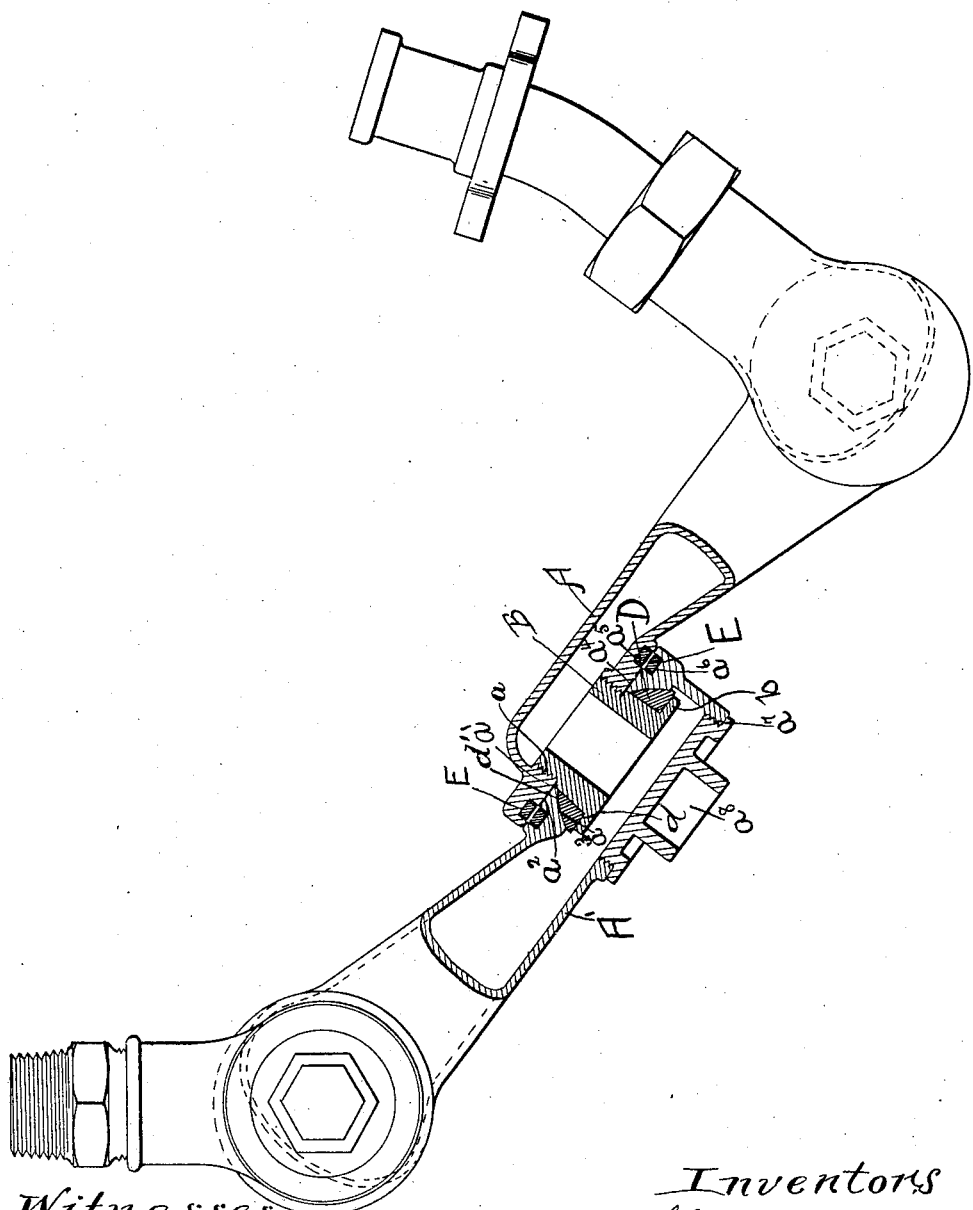
Witnesses.
E. B. Gilchrist
D. L. Davies
Inventors
Charles H. Weaver
Lemuel H. Houghton,
by J. B. Fay
atty.

No. 762,667.

Patented June 14, 1904.

UNITED STATES PATENT OFFICE.

CHARLES H. WEAVER AND LEMUEL H. HOUGHTON, OF ELKHART, INDIANA, ASSIGNORS OF ONE-FIFTH TO CHARLES J. DONAHUE, OF CLEVELAND, OHIO, AND GRANT H. HOUGHTON, OF CHICAGO, ILLINOIS.

FLEXIBLE PIPE-JOINT.

SPECIFICATION forming part of Letters Patent No. 762,667, dated June 14, 1904.

Application filed June 6, 1903. Serial No. 160,310. (No model.)

*To all whom it may concern:*

Be it known that we, CHARLES H. WEAVER and LEMUEL H. HOUGHTON, citizens of the United States, and residents of Elkhart, county of Elkhart, and State of Indiana, have invented a new and useful Improvement in Flexible Pipe-Joints, of which the following is a specification, the principle of the invention being herein explained and the best mode in which we have contemplated applying that principle, so as to distinguish it from other inventions.

Our invention relates to flexible pipe-joints, and particularly to that class of joints used in connecting air or steam ducts of two relatively movable systems, such as the system of ducts embodied in each of two coupled railway-cars.

The object of the invention is to obtain a joint of said character which may be constructed without the use of rubber or other fabric or material of comparatively easy destructibility and to form an improvement upon the structure shown, described, and claimed in United States Letters Patent No. 622,305, issued April 4, 1899.

Our present invention consists of means hereinafter fully described, and particularly set forth in the claims.

The annexed drawing and the following description set forth in detail certain mechanism embodying the invention, such disclosed means constituting but one of various mechanical forms in which the principle of the invention may be used.

In said annexed drawing the figure represents an elevation of a joint embodying our invention, the joined ends of the two joint members being shown in axial cross-section.

The joint embodying the invention consists of a member A, member A', and member B, a packing-ring D, and a coiled spring E, the general construction embodying elements of a nature similar to those embodied in the structure of the above-named patent. In our present invention, however, a difference in the relation of these elements affords advantages hereinafter described.

The member A is provided with a lateral tapped opening $a$, into which is screwed the member B. The outer end of the latter is provided with a flange $b$. Member A' is provided with an opening $a'$, which is surrounded upon the outside of the member A' by a flat annular surface $a^2$, and upon the inside surrounding said opening is a concave bearing-surface $a^3$. The member B projects through the opening $a'$, so as to bring the flange $b$ some distance beyond the surface $a^3$, thereby forming an annularly-shaped space in which is located the packing-ring D, the latter being formed with a flat surface $d$, contacting the flange $b$, and a convex surface $d'$, contacting the concave surface $a^3$. Opposing the flat surface $a^2$ and formed upon member A is a second flat annular surface $a^4$, and in each of these surfaces is formed an annular groove $a^5$ and $a^6$ of equal diameter and coaxial with the openings $a\ a'$ and the surfaces $a^3$ and $d'$. These opposing grooves form a seat for a coiled or helical spring E, which is compressed therein so as to exert pressure against the two opposing ends of the joint elements A and A' and cause the latter to tend to separate. Such action causes the flange $b$ to bear against the packing-ring D, so as to effect a tight joint between the ring and surface $a^3$ and between the flange $b$ and surface $d$ of the ring. Opposite opening $a'$ is a tapped opening $a^7$, in which is screwed a removable plug $a^8$. The spring E being coaxial with, of greater diameter than, and bearing around and outside the openings $a$ and $a'$ of the two joint elements, a very even pressure is brought to bear upon the packing-ring surfaces, and practically no liability of leakage is thereby encountered. Furthermore, when it is desired to examine or clean the interior of the joint plug $a^8$ may be removed without the attendant removal of the springs, as was the case in the construction described in said above-named patent—an obvious advantage.

Other modes of applying the principle of our invention may be employed instead of the one explained, change being made as regards the mechanism herein disclosed, provided the means stated by any one of the following claims or the equivalent of such stated means be employed.

We therefore particularly point out and distinctly claim as our invention—

1. In a flexible pipe-joint, the combination of two joint elements, a flanged member connected with one of such elements, a packing-ring intermediate of such flanged member and the other element, and a coiled spring located within both of such elements, engaging the same, and tending to separate their opposing faces.

2. In a flexible pipe-joint, the combination of two joint elements, a flanged member connected with one of said elements, a packing-ring intermediate of such flanged member and the other element, and a coiled spring coaxial with said packing-ring, located within both of such elements, engaging the same, and tending to separate their opposing faces.

3. In a flexible pipe-joint, the combination of two joint elements, a flanged member connected with one of said elements, a packing-ring intermediate of such flanged member and the other element, and a helical spring coaxial with said packing-ring, located within both of such elements, engaging the same, and tending to separate their opposing faces, such spring being out of direct engagement with said packing-ring.

4. In a flexible pipe-joint, the combination of two joint elements, a flanged member connected with one of said elements, a packing-ring intermediate of such flanged member and the other element, and a helical spring coaxial with said packing-ring, located within both of such elements, engaging the same, and tending to separate their opposing faces, such spring being of a diameter greater than that of said packing-ring.

5. In a flexible pipe-joint, the combination of two joint elements formed with contiguous parallel faces, a flanged member connected with one of such two elements having its axis transversely located relatively to said faces, a packing-ring intermediate of said flanged member and the other element, oppositely-located grooves being formed in said contiguous faces, and a spring located within said two joint elements, incased in such grooves, and arranged to tend to separate such faces.

Signed by us this 11th day of May, 1903.

CHARLES H. WEAVER.
LEMUEL H. HOUGHTON.

Attest:
HERRICK E. STEPHENS,
WILLIAM B. HILE.